United States Patent [19]
Ochiai et al.

[11] 3,757,661
[45] Sept. 11, 1973

[54] MOVABLE MIRROR ARRANGEMENT IN A SINGLE-LENS REFLEX CAMERA

[75] Inventors: Kohei Ochiai, Tokyo; Kiyoakira Kato, Chiba-ken, both of Japan

[73] Assignee: Olympus Optical Company, Tokyo, Japan

[22] Filed: Nov. 10, 1971

[21] Appl. No.: 197,380

[30] Foreign Application Priority Data
Nov. 16, 1970 Japan.............................. 45/100838

[52] U.S. Cl. .................................................... 95/42
[51] Int. Cl. ........................................... G03b 19/12
[58] Field of Search.......................................... 95/42

[56] References Cited
UNITED STATES PATENTS
| | | | |
|---|---|---|---|
| 2,006,007 | 6/1935 | Zimmer | 95/42 X |
| 1,484,584 | 2/1924 | Tavern | 95/42 |
| 2,234,345 | 3/1941 | Hershberg | 95/42 |

Primary Examiner—Samuel S. Matthews
Assistant Examiner—Michael Harris
Attorney—David Toren et al.

[57] ABSTRACT

In a camera of the single-lens reflex ground-glass focusing type, a mirror is positioned in an inclined position on the optical axis of the taking lens and between the lens and a location for a photosensitive surface. When an exposure is taken with the camera, the mirror is retained in the inclined position and is moved transversely out of the optical axis along a rectilinear path into a standby position. In the standby position a portion of the mirror is located within a housing which extends laterally from the camera body. The housing also acts as a grip for holding the camera. The housing is telescopically constructed so that it can be pulled outwardly from or pushed inwardly into the camera. When the housing is pulled outwardly, the camera is in the operating condition and when the housing is pushed inwardly the camera is in the non-operating condition. The member for operating the camera shutter is operatively connected to the housing so that the member is automatically locked when the camera is in its non-operating condition.

19 Claims, 11 Drawing Figures

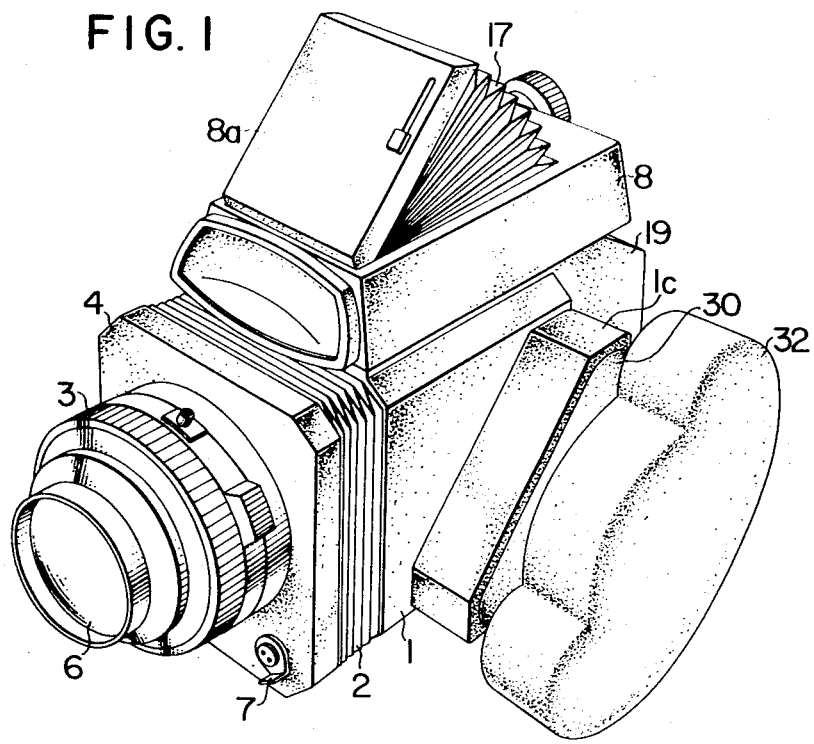
FIG. I
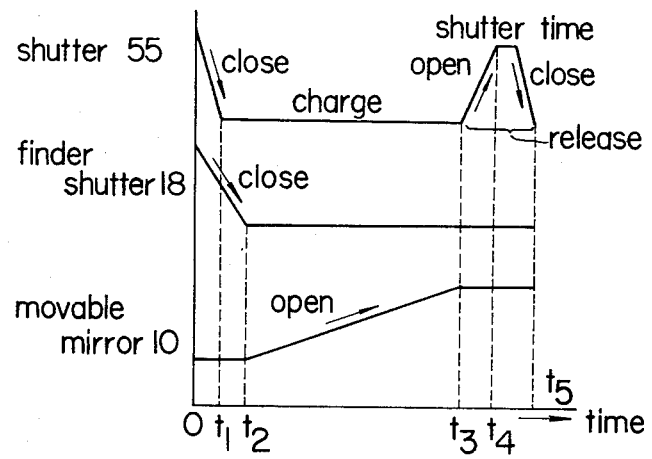
FIG. II

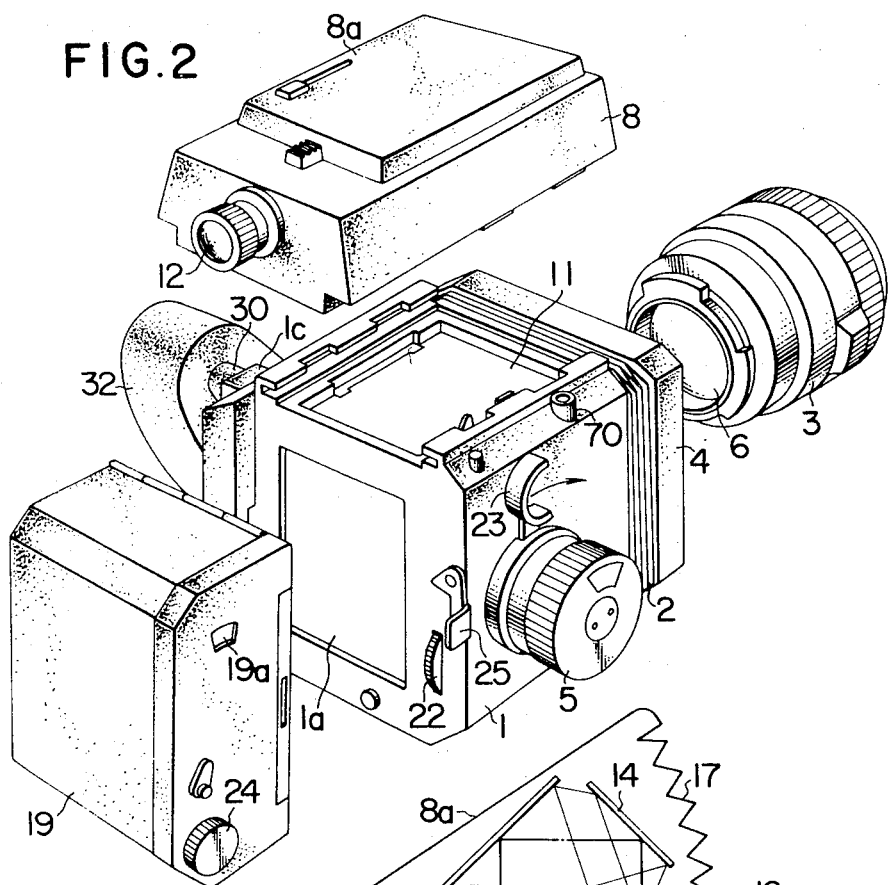
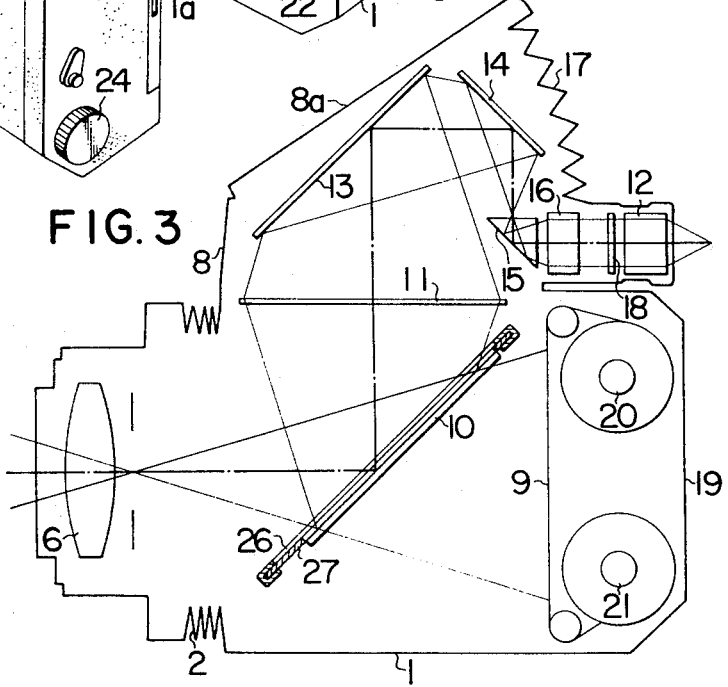

INVENTORS
KOHEI OCHIAI
KIMOAKIRA KATO

BY Toren and McGeady
ATTORNEYS

INVENTORS
KOHEI OCHIAI
KIYOAKIRA KATO

BY Toren and McGrady
ATTORNEY

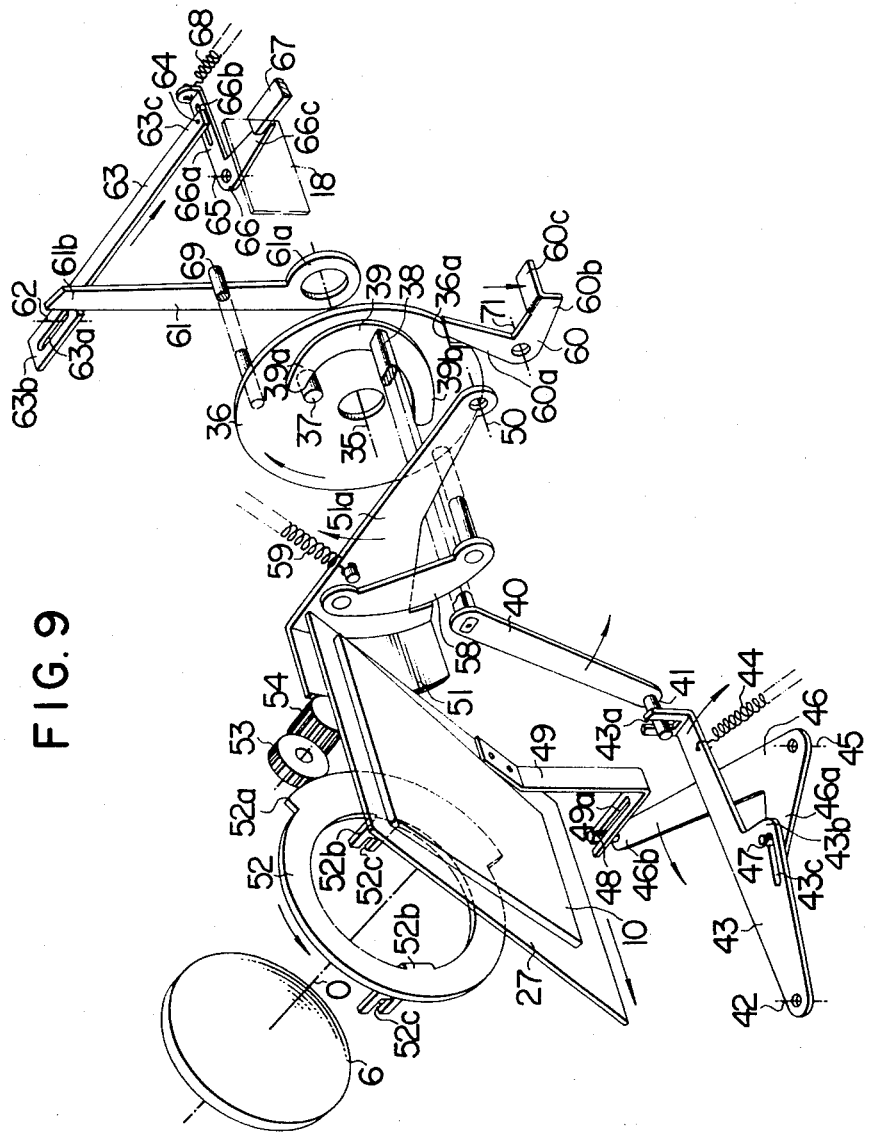

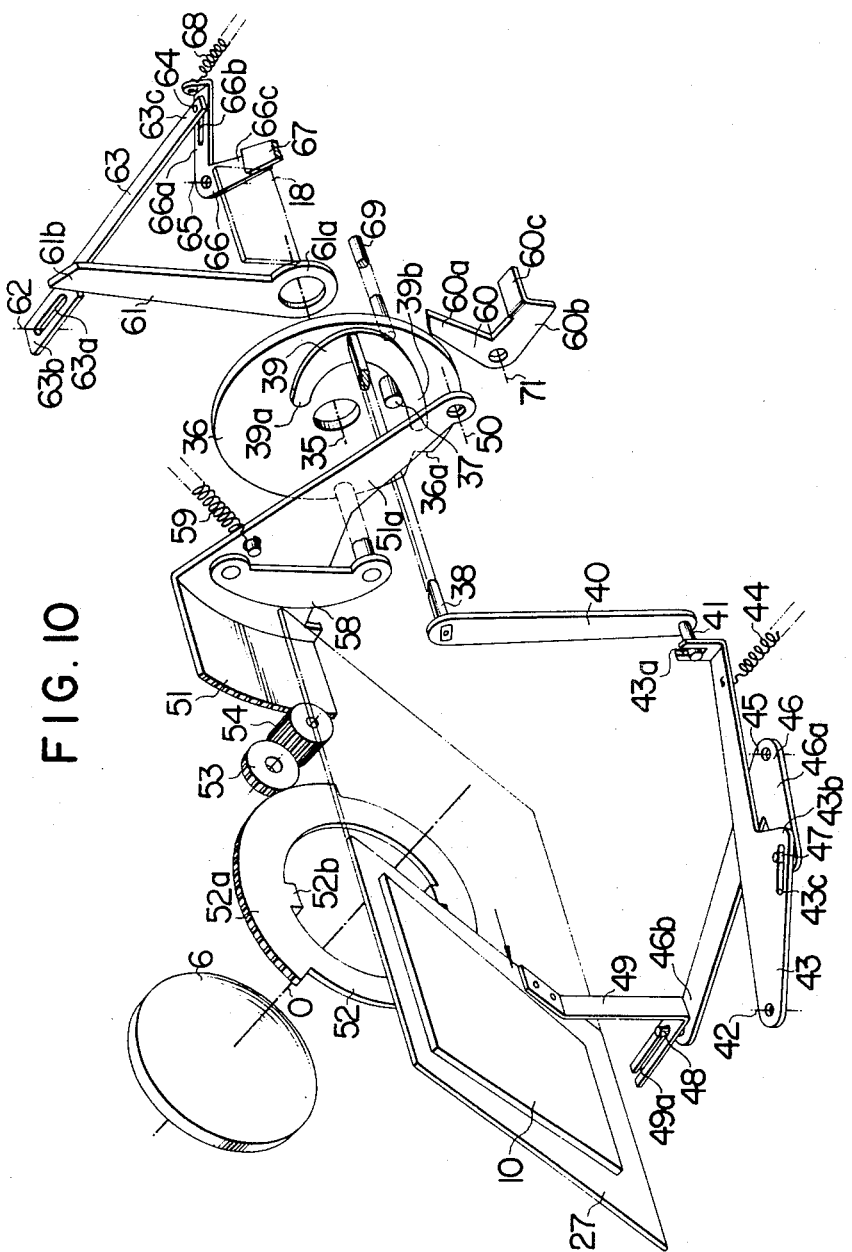

3,757,661

MOVABLE MIRROR ARRANGEMENT IN A SINGLE-LENS REFLEX CAMERA

BACKGROUND OF THE INVENTION

The present invention relates to single-lens reflex cameras in general, and, more particularly, it is directed to a movable mirror arrangement for a single-lens reflex camera of the type which uses film in roll form, generally referred to as a brownie film.

In one type of mirror used in single-lens reflex cameras of the type described and known in the art, the movable mirror is arranged in an inclined position and is interposed between the taking lens and a photosensitive surface so that it can be swung upwardly with the lower end of the mirror pivoting upwardly about the upper end edge at the time of exposure, as is the case with small single-lens reflex cameras of the type using a Leica type film. In another type known in the art, the movable mirror is located in an inclined position and is arranged to slide downwardly in the forward direction from the inclined position so that it moves out of the path of picture-taking light at the time of exposure.

Certain disadvantages are associated with the use of these two types of mirrors in single-lens reflex cameras. Mirror-shake is inevitable with the mirror of the first type mentioned because the mirror swings from an inclined position into a horizontal position during picture-taking. Besides, a camera containing this type of mirror requires a segmental space for the movement of the mirror. This prevents the end of the lens within the camera from being positioned next to the movable mirror and causes inconvenience when a short focal length lens is used.

On the other hand, the mirror of the second type is free from mirror-shake when an exposure is made and the end of the lens within the camera can be arranged near to the movable mirror. However, since the mirror shifts forwardly and downwardly from its inclined position, a complex actuating mechanism is required to move the mirror and it is not possible to reduce the size of the camera.

The operating mechanism for displacing the mirrors of the aforementioned types are arranged in a position inclined 45° with respect to the optical axis of the taking lens prior to an exposure being made and then are moved to a position in which they are disposed parallel to the optical axis as an exposure is made. Accordingly, it is necessary, after each exposure, to restore the mirror from the parallel position to the inclined position. The most critical standards should be applied in maintaining the precision and accuracy of the return movements of the mirror. However, this makes the production of the drive mechanism troublesome and costly.

SUMMARY OF THE INVENTION

An object of this invention is to provide a novel single-lens reflex camera which obviates the disadvantages of conventional single-lens reflex cameras, particularly those cameras which employ a movable mirror of a relatively large size.

Another object of the invention is to provide a single-lens relfex camera using a movable mirror which stays in the inclined position as it moves, at the time of exposure, transversely along a rectilinear path out of the optical axis of the taking lens into a standby position. In the standby position one end portion of the mirror can be located within a housing extending laterally from the camera. The housing forms a grip for holding the camera during use.

Another object of the invention is to fit the housing in a lighttight manner over a cover for the mirror passage projecting outwardly through the wall of the camera, and the grip provided by the housing is adapted to move toward and away from the camera body.

Still another object of the invention is to couple the grip-housing to the shutter button, so that when it is moved toward the camera body to bring the camera into the non-operative condition the shutter button is automatically brought to the non-operative condition.

In accordance with the present invention, a single-lens reflex camera is provided with a mirror supported in an inclined position and interposed between the taking lens and a photosensitive surface so that it can be moved transversely out of the optical axis of the taking lens while it is maintained in the inclined position. As a result, the mirror can be moved to a standby position at the time of exposure so that it does not interfere with the taking lens light flux.

By maintaining the mirror in the 45° inclined position as it is moved out of and returned into the optical path of the taking lens facilitates the production of cameras because no critical standards need be applied to the operation of the mirror actuation mechanism. Besides, no mirror-shake is caused when the mirror moves because its movement is directed transversely in a rectilinear path. This offers the advantages that the mirror can be increased in size and the taking lens can be arranged in the vicinity of the mirror so that its end within the camera is closer to the surface of the mirror.

While there is an increase in the transverse dimension of the camera body for positioning the mirror in the grip-housing when it is moved out of the path of picture-taking light, the invention permits a compact overall size of the camera because the housing which forms the grip for the camera can be moved inwardly toward the wall of the camera when the camera is not being used.

Since the shutter button is coupled to the grip, it can be automatically brought to an inoperative condition when the grip is moved inwardly toward the wall of the camera in placing the camera in an inoperative condition. This prevents accidental action of the actuation mechanisms for the shutter button and mirror.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

FIG. 1 is a perspective view of a single-lens reflex camera embodying the present invention;

FIG. 2 is a perspective view of the taking lens, viewing section and film holder separated from the camera of FIG. 1 and viewed obliquely from the rear of the camera;

FIG. 3 is a side view showing the optical system of the camera according to this invention;

FIG. 9 is an exploded perspective view of the actuating mechanism shown in FIG. 8;

FIG. 10 is an exploded perspective view of the actuation mechanism of FIG. 8 showing the state in which the mechanism is rendered operative; and FIG. 11 is a time chart diagrammatically showing the operation of the shutter, shutter finder and movable mirror when the shutter button is depressed.

DESCRIPTION OF A PREFERRED EMBODIMENT

Figure 4:
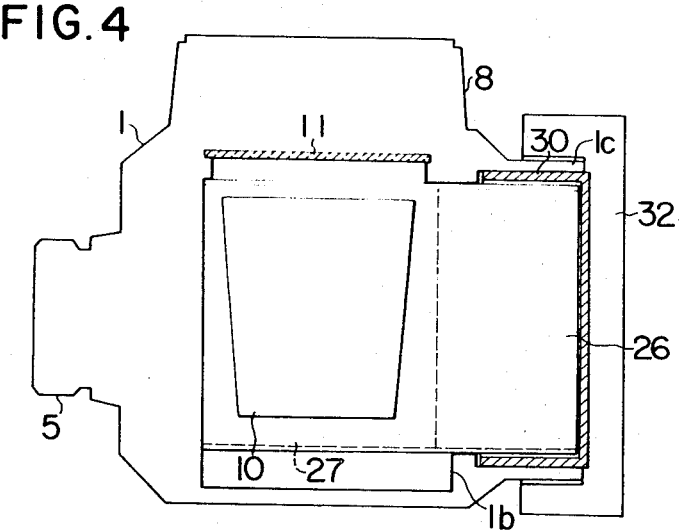
FIG. 4 and FIG. 5 are schematic front elevations of the camera according to this invention, FIG. 4 showing the camera in the non-operative condition with the grip for holding the camera moved inwardly toward the camera body and FIG. 5 showing the camera in the operative condition with the grip moved outwardly from the camera body.

In FIG. 1 a single-lens reflex camera is shown consisting of a camera body 1 with a mounting frame 4 for attaching a taking lens tube 3 to a forward portion of the camera body, with a bellows 2 being interposed between camera body 1 and lens tube 3. When a knob 5 as shown in FIG. 2 is turned, mounting frame 4 can move a taking lens 6 mounted in the frame back and forth in the direction of its optical axis through the agency of a rack and pinion (not shown), for bringing a subject into focus with respect to the taking lens 6.

Mounting frame 4 is provided with a locking lever 7 for locking taking lens tube 3, which is removably mounted on mounting frame 4 through bayonet mount, and precluding dislodging of lens tube 3. When the taking lens 3 is replaced by another lens, locking lever 7 is pivoted to unlock the lens tube and permit dislodging of the lens tube from the bayonet mount and the mounting of a new lens.

A viewing case 8 containing a collapsible viewing optical system therein is detachably secured to an upper portion of the camera body 1.

The viewing optical system of the single-lens reflex camera according to this invention comprises, as shown in FIG. 3, a movable mirror 10 arranged in a position inclined 45° to the optical axis of the taking lens 6 and interposed between taking lens 6 and a photosensitive surface 9 located on the opposite side of the mirror from the lens. A focusing screen 11 is disposed above and on the opposite side of the mirror from the photosensitive surface 9. The focusing screen and the photosensitive surface both form the same angle with respect to the mirror. Further, the viewing optical system includes a first reflector 13, a second reflector 14, a prism 15 and an erect image lens system 16 for introducing an image of the subject formed on the focusing screen 11 to an eyepiece lens system 12. First and second reflectors 13 and 14, prism 15, erect image lens system 16 and eyepiece lens system 12 are positioned in the viewing case 8.

When the viewing system is not in use, first and second reflectors 13 and 14 can be brought to a horizontal position in which they are superposed one over the other and are folded into case 8 by closing a cover 8a mounted on an upper surface of case 8. Cover 8a and case 8 are connected by a bellows 17 to intercept any light which might otherwise find its way into the viewing optical system.

If cover 8a is brought to an upper position on case 8 as shown in FIG. 1 when the viewer is used, then first and second reflectors 13 and 14 are brought automatically to an inclined position in which the reflectors are inclined 45° above focusing screen 11 and disposed in face-to-face relationship to bring the viewing optical system to an operating position. When the viewing optical system is in the inclined position, an image formed on focusing screen 11 is introduced to prism 15 to form an image which can be seen as an erect image on eyepiece lens system 12 through erect image lens system 16 arranged rearwardly of prism 15.

A viewing shutter 18 interposed between erect image lens system 16 and eyepiece lens system 12 is operatively coupled to movable mirror 10 so that, when movable mirror 10 moves out of the optical path of the taking lens at the time of exposure, viewing shutter 18 closes the path of light in the viewer before mirror 10 begins to move out of the path of light for the taking lens, for intercepting light entering into the camera through the eyepiece lens system 12.

As shown in FIGS. 1,2 and 3, a film holder 19 is detachably secured to a rear portion of the camera body 1 for positioning a film of the brownie type in roll form in the camera. Film holder 19, as shown in FIG. 3, contains a film wound in roll form on a film supply shaft 20 and trained about a take-up shaft 21. Film holder 19 also contains wound film counter means (not shown) for the film to indicate, through a window 19a shown in FIG. 2, the number of wound frames of the film. When film holder 19 is mounted in camera body 1, a take-up shaft drive gear (not shown) in the holder is brought into meshed engagement with a connection gear 22 partly exposed to view as shown in FIG. 2. Film advance can be effected by operating a film advance lever 23 mounted coaxially with focusing control knob 5 in the direction of the arrow shown in FIG. 2 for rotating the gear 22 coupled to lever 23.

Disposed on an outer wall surface of film holder 19, in the vicinity of take-up shaft 21, is a manual film advance knob 24 which is turned to rotate take-up shaft 21. This knob 24 is intended to wind a leading portion and a trailing portion of the film in on the take-up shaft 21.

The film holder 19 is attached to the rear wall of camera body 1 by a locking member 25 and closes an exposing opening 1a in the rear wall. If a light intercepting plate (not shown) of the film holder 19 attached to the camera body is pulled out, the photosensitive surface 9 of the film trained about film supply shaft 20 and film take-up shaft 21 in film holder 19 is exposed in a position conjugate with that of focusing screen 11 with respect to movable mirror 10.

In the single-lens reflex camera according to this invention, the taking lens, viewing optical lens sytem and film holder are detachably fixed to the camera body, as shown in FIG. 2.

The light entering the camera body through taking lens 6 is normally prevented from impinging on the photosensitive surface 9 in the interior of camera body 1 by movable mirror 10 inclined 45° to the optical axis and interposed between taking lens 6 and surface 9. Movable mirror 10 is supported, as shown in FIG. 3, by a slide plate 27 which is arranged to move transversely along a rectilinear path in a sliding motion along a guide plate 26 located in camera body 1 and disposed in a position in which it is inclined at 45° with respect to the optical axis of taking lens 6.

Figure 6:
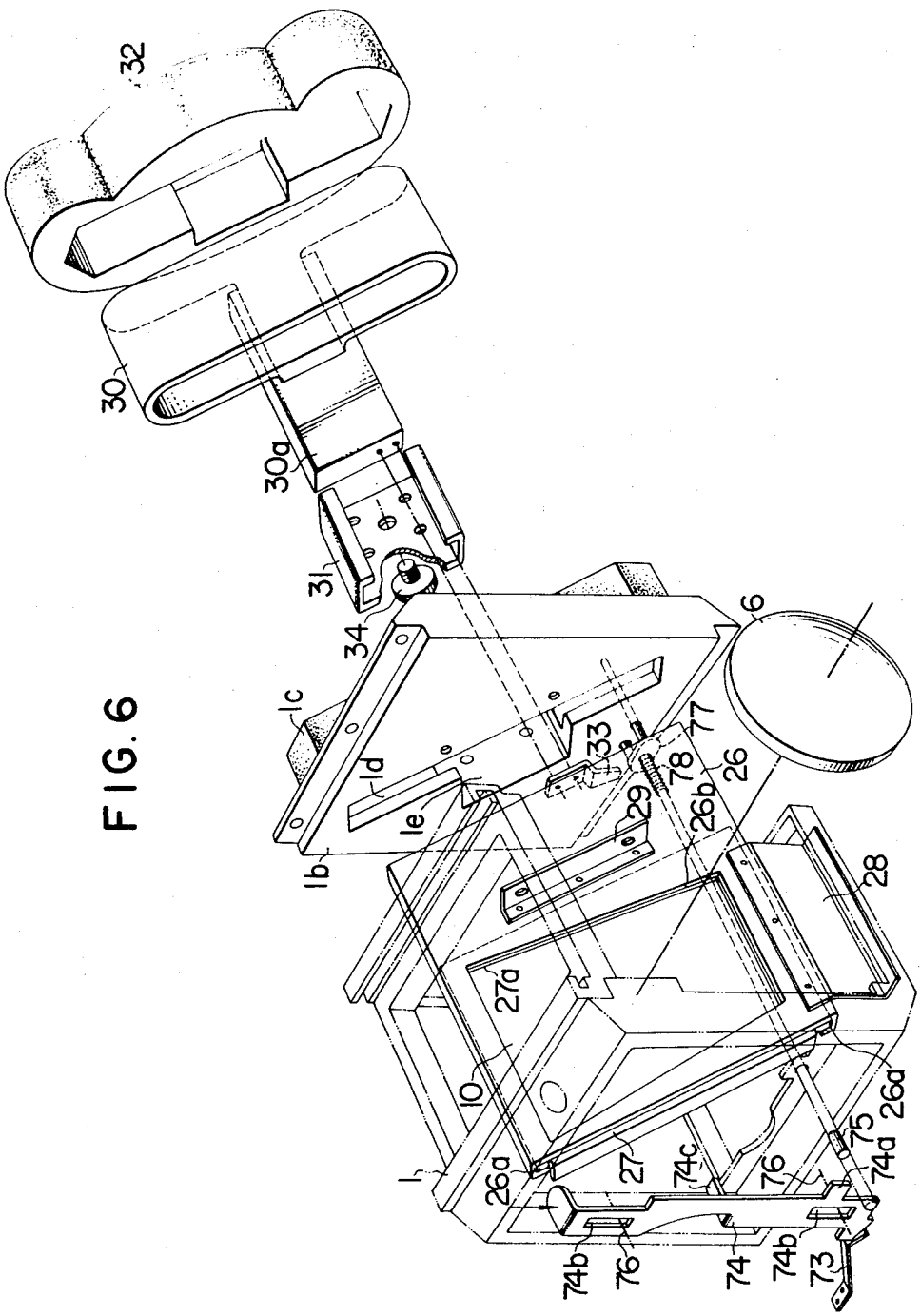
FIG. 6 is an exploded perspective view of the camera according to the present invention showing its essential portions.

More specifically, guide plate 26, which is rectangular in shape, is secured in an inclined position to camera body 1 by mounting members 28 and 29, as shown in FIG. 6. When camera body 1 is viewed from its front, the right end portion of guide plate 26 extends outwardly through a right side wall 1b of camera body 1. Upper and lower marginal portions of guide plate 26 are bent rearwardly of form channels 26a and 26a for receiving the slide plate 27 which is superposed on guide plate 26 and is arranged to move toward the right end portion of guide plate 26 while being guided by the channels 26a and 26a.

A window 26b for admitting picture-taking light through the camera body is formed in guide plate 26 in a position which is aligned with the taking lens 6. A window 27a, identical in size and shape with and registering in position with the window 26b is formed in slide plate 27. Mirror 10 is secured to slide plate 27 such that it covers window 27a on the rear side. Accordingly, when the two windows 26b and 27a are in registration, the light passing through taking lens 6 is reflected upwardly by mirror 10 toward focusing screen 11 shown in FIG. 3, so that the mirror 10 intercepts the light and prevents it from impinging on the photosensitive surface 9.

Figure 5:
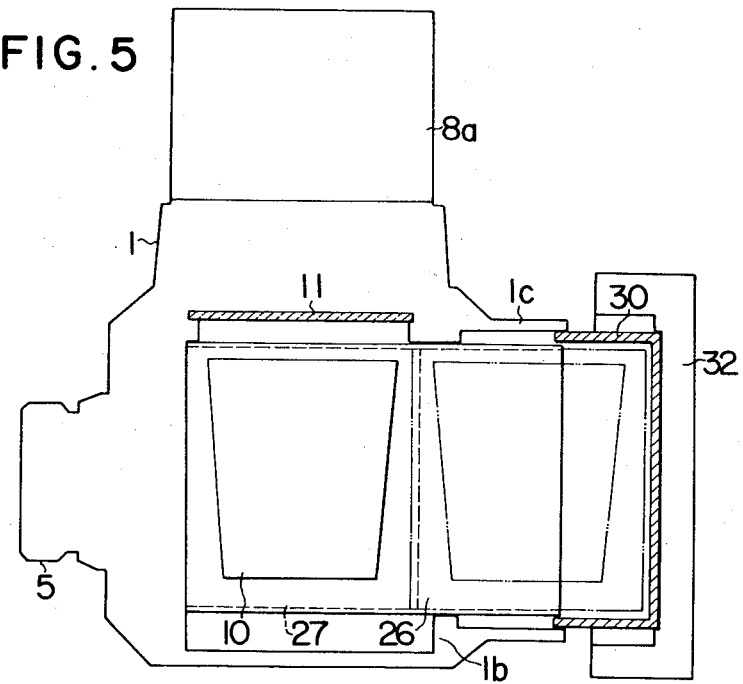

Slide plate 27 is sufficiently large to mount mirror 10. When slide plate 27 moves along guide plate 26 into a position in which it is displaced from the path of the picture-taking light at the time of exposure, a portion of slide plate 27 and of mirror 10 extend outwardly from the guide plate 26 as shown in FIG. 5.

The right end portion of guide plate 26 which extends outwardly from the camera body 1 through its right side wall 1b is covered by a cover member 1c formed integrally with and extending outwardly from the right side wall 1b. The outer end of the cover member 1c is open. A flattened cylindrical member 30 encloses the right end portion of guide plate 26 when the camera is in the inoperative condition and is telescopically fitted in the interior of cover member 1c so that it can move toward and away from the side wall 1c. Cylindrical member 30 is maintained in a lighttight manner with respect to the cover member 1c.

A rectangular guide 30a for guiding the lateral movement of the cylindrical member 30 is attached to a central portion of an outer surface of a rear wall of cylindrical member 30 as shown in FIG. 6. Guide 30a is formed integrally with cylindrical member 30 with substantially one-half of its lengthwise dimension projecting from the cylindrical member 30 inwardly toward the camera body. Guide 30a is slidably supported by a holder 31 secured in a recess 1e formed in right side wall 1b of the camera body. A slit 1d extends from the recess 1e and the right end portion of guide plate 26 extends outwardly of the camera body through the slit into the cover member 1c.

A grip 32 for holding the camera is fitted on the exterior of the cylindrical member 30. The member 30 and grip 32 act as a unit. The exterior surface of grip 32 has a wave-shaped configuration. When grip 32 is pulled outwardly from the camera body, the guide 30a of cylindrical member 30 is guided by holder 31 and moves outwardly from cover member 1c to form a path for the sliding movement, as shown in FIG. 5, of slide plate 27 when movable mirror 10 is displaced from the path of picture-taking light at the time of exposure.

Figure 7:
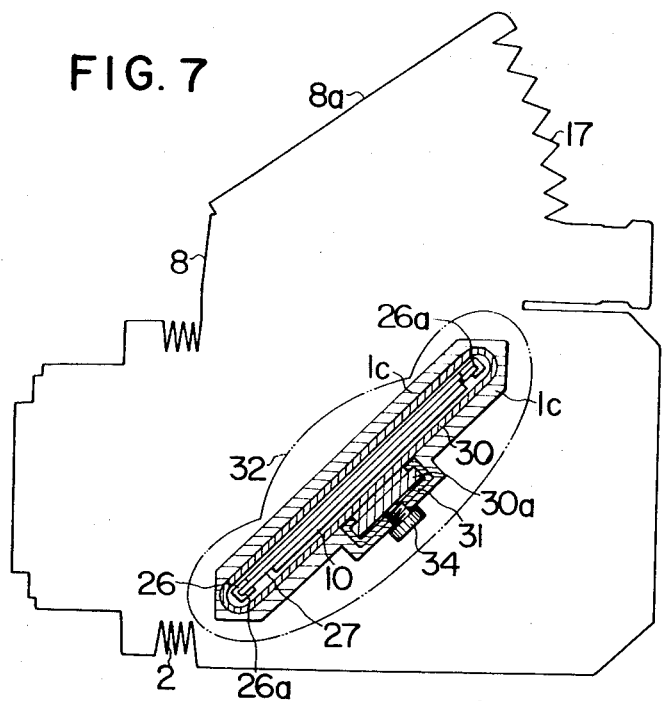
FIG. 7 is a sectional view through the path of movement of the mirror outwardly from the camera.

A stopper 33 is provided at the inner end of the guide 30a for the cylindrical member 30. Stopper 33 is adapted to abut against the inner surface of right side wall 1b when cylindrical member 30 is moved outwardly from the camera body for limiting its outward movement. A set-screw 34, accessible on the exterior of cover member 1c is threaded into holder 31 and the wall of cover member 1c to which holder 31 is secured, as shown in FIG. 7. Set-screw 34 secures the grip 32 in any one of its positions, as desired. That is, if set-screw 34 is tightened after grip 32 is moved inwardly toward the camera body into the inoperative condition of the camera, as shown in FIG. 4, it is possible to secure grip 32 and hence the camera in the inoperative condition. Conversely, if set-screw 34 is tightened after grip 32 is moved outwardly of the camera body away from right side wall 1c into the operative condition of the camera, it is possible to secure grip 32 and hence the camera in the operative condition.

An actuation mechanism, for displacing the movable mirror 10 at the time of exposure so that an end portion of the mirror is located in grip 32 outwardly of the camera body, will now be described with reference to FIG. 8 to FIG. 10. A shaft 35 arranged to rotate when the film winding lever 23, shown in FIG. 2, is operated is rotatably mounted on a left side wall (not shown) of camera body 1 as viewed from the front of the camera. A disk 36 is fixed on the shaft 35 and a pin 37 is attached to the disk and is directed inwardly of the camera. An upper side of arm 39a of a bellcrank 39 is positioned against pin 37. Bellcrank 39 which is pivotally secured at its center to the outer end of a shaft 38, rotatably connected to an immovable member (not shown) of the camera, has its other arm 39b disposed in the path of travel of pin 37. Near the end of its travel, pin 37 strikes and moves the end of the other arm 39b out of the path of its travel for rotating shaft 38 counter clockwise in FIG. 9.

A pivotal arm 40 is secured at one end to the inner end of shaft 38 and has a pin 41 attached to its opposite end, as shown in FIG. 9. Pin 41 is positioned in an upright fork 43a formed in a free end portion of an arm 43 which is mounted at its other end on a shaft 42 for angular movement of the shaft. Arm 42 is normally biased for clockwise movement about shaft 42 by the force of a spring 44, and its clockwise movement is prevented by the end of one arm 39a of bellcrank 39 abutting against pin 37.

In its intermediate portion the arm 43 has a protuberance 43b in which a slot 43c is formed which receives a pin 47 attached to one arm 46a of a bellcrank 46 pivotally mounted on a shaft 45. Bellcrank 46 has another arm 46b which is arranged at an angle of 45° with respect to an optical axis 0 of taking lens 6 and which extends below the slide plate 27 mounting movable mirror 10. A pin 48 is attached to the end portion of the arm 46b and fits into a fork 49a formed in a bent lower portion of an L-shaped connector 49 attached to the slide plate 27.

Adjacent the disk 36, a segmental gear 51 is pivotally supported on a shaft 50. The gear 51 is formed in an end edge of an inwardly bent portion of a lever 51a supported at its base by shaft 50 and extending segmentally therefrom. Gear 51 is in meshed engagement, through intermediate gears 53 and 54, with a serrated portion 52a provided on an outer peripheral surface of a shutter actuation ring 52 adapted to charge and release the shutter.

Figure 8:
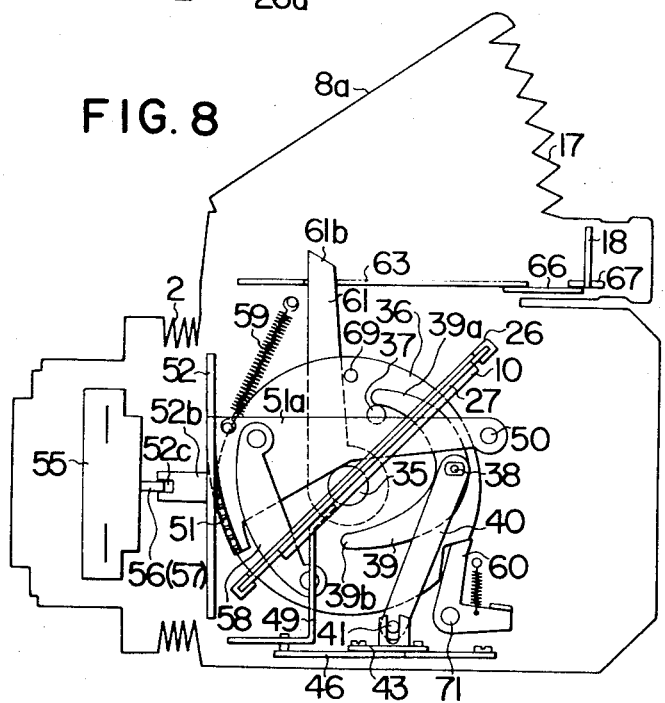
FIG. 8 is a side view of the actuating mechanism for the movable mirror.

On an inner peripheral surface of shutter actuation ring 52, in two positions diametrically opposed to each other, two forwardly directed bent portions 52b and 52b are formed at a forward end portion with forks 52c and 52c in which a charge pin 56 and a release pin 57 of a shutter 55 are engaged, respectively, as shown in FIG. 8. When shutter actuation ring 52 is rotated in the direction of the arrow shown in FIG. 9, shutter 55 is first charged by charge pin 56 through one fork 52c, and then charged shutter 55 is released by release pin 57 through the other fork 52c.

Lever 51a and disk 36 are interconnected by a connecting rod 58. A drive spring 59 is mounted between lever 51a and an immovable member (not shown) and urges lever 51a to pivot clockwise about shaft 50 in FIG. 9. The clockwise movement of lever 51a is precluded by one arm 60a of bellcrank-shaped release member 60 which engages in a cutout 36a formed in the circumferential peripheral surface of disk 36. Release member 60 is rotatably mounted on a shaft 71 and its other arm 60b, formed at its upper edge with a bent portion 60c, is adapted to be displaced in the direction of the arrow in FIG. 9 when a shutter release lever, subsequently to be described, is moved downwardly.

The shaft 35 on which disk 36 is secured extends loosely through an opening formed in a base portion 61a of an arm 61 which has a free end 61b in contact with a protuberance formed at a base portion 63b of a slide bar 63. Slide bar 63 is formed at its base portion 63b with a guide slot 63a which receives therein a support shaft 62, so that slide bar 63 can move toward the optical axis 0. A downwardly oriented pin 64 is attached to the other end of slide bar 63 and extends into a slot 66a formed in one arm 66a of a bellcrank 66 mounted on a shaft 65.

At the end of the other arm 66c of bellcrank 66, a pusher 67 is arranged for moving viewing shutter 18 when bellcrank 66 moves clockwise about shaft 65, thereby closing the viewing optical path. A compression spring 68 is mounted between one arm 66a of bellcrank 66 and an immovable member (not shown) of the camera and urges the bellcrank clockwise in FIG. 9. The clockwise movement of the bellcrank 66 is blocked by arm 61 abutting against a pin 69 attached to disk 36, as shown in FIG. 10, through the agency of slide bar 63.

The operation of the actuation mechanism for movable mirror 10 will now be described. If grip 32 is moved outwardly from camera body 1, as shown in FIG. 5, for placing the camera in the operative condition and set screw or rivet 34 is tightened to hold grip 32 in place, then the slide path for slide plate 27 on which movable mirror 10 is mounted extends through the right side wall 1b of camera body 1 into cylindrical member 30 formed integrally with grip 32.

If a shutter button 70 shown in FIG. 2, is depressed when the camera is in its operative condition, as described above, bent portion 60c is pushed in the direction of the arrow in FIG. 9 and release member 60 rotates clockwise about shaft 71, thereby releasing arm 60a from engagement with the cutout 36a of disk 36. Accordingly, segmental gear 51 rotates clockwise about shaft 50 due to the biasing force of spring 59, with the result that shutter operation ring 52 is rotated through intermediate gears 54 and 53 in the direction of the arrow about optical axis 0 in FIG. 9. With this movement the shutter 55 is charged.

The angular rotation of segmental gear 51 about shaft 50 causes the disk 36 to rotate in the direction of the arrow in FIG. 9 because of the connecting rod 58. Pin 37 also rotates with disk 36, so that the arm 39a of bellcrank 39 abutting against pin 37 pivots and follows the pin 37. This is occasioned by the pivotal movement of arm 40, which is secured to the end of the shaft 38 opposite to which the bellcrank 39 is secured, in the direction of the arrow in FIG. 9 caused by arm 43 which pivots clockwise about shaft 42 due to the biasing force of spring 44.

The pivotal movement of arm 40 results in the rotation of shaft 38 to which arm 40 is secured, and the bellcrank 39 moves angularly in following relation to pin 37. If arm 43 rotates about shaft 42, then bellcrank 46 moves counter clockwise about shaft 45. Angular movement of bellcrank 46 results in pin 48, attached to the end portion thereof, causing L-shaped connector 49 to move, so that slide plate 27 mounting movable mirror 10 begins to move in a rectilinear sliding motion along channels 26a, 26a formed in guide plate 26 as shown in FIGS. 6 and 7 in a direction normal to the optical axis 0 toward cylindrical member 30 in grip 32.

When the pin 37 passes the horizontal position of shaft 38 as it rotates, it abuts against the inner edge of the other arm 39b of bellcrank 39, and displaces the other arm 39b out of the path of its rotation. Thus, shaft 38 also rotates and causes, through arms 40, 43 and 46, the L-shaped connector 49 to move, thereby displacing movable mirror 10 and slide plate 27 completely out of the path of the picture-taking light, as shown in FIG. 10. The position to which mirror 10 on slide plate 27 is moved is the standby position and it extends through the right side wall 1c of camera body 1 into grip 32, as shown in FIG. 5.

Pin 37 which causes bellcrank 39 to pivot, is released from engagement with arms 39a and 39b during the time when it passes from engagement with one arm 39a and moves into engagement with the other arm 39a of the bellcrank 39. During this time, the pivotal movement of bellcrank 39 continues because of the biasing force of spring 44.

Shutter operation ring 52 is rotated by segmental gear 51 and charges the shutter from the time disk 36 starts rotating until the time movable mirror 10 begins to move out of the path of picture-taking light, and it releases the charged shutter when the movable mirror 10 has moved completely out of the path of picture-taking to its standby position.

The pin 69 extending laterally from the disk 36 rotates with it and releases arm 61 from pin 69. By freeing arm 61, the bellcrank 66 is rotated clockwise about shaft 65 in FIG. 10 by the biasing force of compression spring 68. Clockwise rotation of bellcrank 66 results in pusher 67 attached to the end of the other arm 66c of bellcrank 66, displacing the viewing shutter 18 which moves into the path of viewing light and blocks its passage into the camera body.

Since the embodiment shown and described concerns a single-lens reflex camera having a lens shutter, the shutter 55 is normally open. Accordingly, the blades of shutter 55 are closed in the camera incorporating this invention by a mechanism (not shown) till shutter button 70, shown in FIG. 2, is depressed and disk 38 begins to rotate.

FIG. 11 is a time chart showing the times of operation of the taking lens shutter 55, the viewing shutter 18 and the mirror 10. From the time chart it can be seen that the blades of shutter 55 close at a point in time $t_1$ following depression of shutter button 70 and that shutter 55 is then charged as disk 36 rotates. Viewing shutter 18 closes at a point in time $t_2$ as the disk 36 rotates. On the other hand, movable mirror 10 moves out of the path of picture-taking light as disk 36 rotates for completely opening the path of picture-taking light at a point in tume $t_3$. After movable mirror 10 has moved out of the path of picture-taking light, charged shutter 55 fully opens at a point in time $t_4$ and closes at a point in time $t_5$ after a predetermined time interval elapses. This completes a picture taking cycle. It will be appreciated that, according to this invention, rotation of disk 36 automatically actuates shutter 55, viewing shutter 18 and movable mirror 10 of the camera when shutter button 70 is depressed to initiate rotation of disk 36.

When the various elements involved are actuated and shooting is completed as shown in FIG. 10, the film in roll form contained in film holder 19 can be advanced a predetermined distance by moving film advance lever 23, shown in FIG. 2, through a predetermined angle in the direction of the arrow.

The angular movement of lever 23 moves the disk 36 in the reverse direction into its original position and release member 60 is returned into engagement in the cutout 36a. Restoration of disk 36 to its original position charges drive spring 59 and its resilient force is again effective. Further, viewing shutter 18 is moved out of the path of viewing light, and movable mirror 10 is restored to its position on the optical axis 0 of the taking lens 6 in the path of picture-taking light, and with all the elements again restored to their respective positions, as shown in FIG. 9, the camera is ready for its next picture taking cycle.

The camera incorporating this invention offers another feature in that, when it is in its inoperative condition with the grip 32 moved toward the camera body, inadvertent depression of the shutter button is prevented, thereby precluding wear which might otherwise be caused on the elements involved.

More specifically, to afford the locking of the shutter button, one end portion of a locking rod 75 is reciprocable into and out of a position disposed below a projection 74a formed on a lower portion of a shutter release bar 74 which is normally urged upwardly by the biasing force of a plate spring 73, as shown in FIG. 6. Release bar 74 is disposed vertically, inwardly of a 'eft side wall of camera body 1, and is formed in its uPper and lower portions with vertical slots 74a and 74b through which support shafts 76 and 76 extend. When the shutter button is depressed from outside, release bar 74 is moved downwardly against the biasing force of plate spring 73.

If bar 74 is moved downwardly, then a bent portion 74c disposed substantially at an intermediate portion thereof and directed inwardly of the camera body moves a bent portion 60c of release member 60 downwardly which is in engagement with the cutout 36a of disk 36, see FIGS. 9 and 10.

The locking rod 75 is disposed transversely of the camera body and extends through its right and left side walls, with one end portion being reciprocable into and out of a position below projection 74a as mentioned above. The other end portion of locking rod 75 extends outwardly of right side wall 1b into the path of movement of cylindrical member 30 integral with grip 32.

A flange 77 is provided on locking rod 75 immediately inwardly of right side wall 1b, and a coil spring 78 is mounted on locking rod 75 between flange 77 and an immovable member (not shown) located adjacent flange 77 on a side thereof opposite right side wall 1b. Thus, locking rod 75 is normally urged rightwardly when viewed from the front of the camera, and when grip 32 is moved away from the camera body to bring the camera into its operative condition, locking rod 75 moves rightwardly and the other end portion thereof extends into the path of movement of cylindrical member 30. Rightward movement of locking rod 75 results in its other end moving out of its position below projection 74a, so that downward movement of release bar 74 can be effected when the shutter button is depressed.

If grip 32 is moved toward the camera body and is disposed immediately adjacent right side wall 1b, the other end of the locking rod 75 is pushed by the cylindrical member 30, so that the locking rod moves leftwardly against the biasing force of spring 78 and its left end moves below the projection 74a of release bar 74, whereby downward movement of release bar 74 is prevented by the locking rod 75 and it is not possible to depress the shutter button.

While a specific embodiment of the invention has been shown and described in detail to illustrate the application of the inventive principles, it will be understood that the invention may be embodied otherwise without departing from such principles.

What is claimed is:

1. A single-lens reflex camera including walls forming a camera body, a case mounted on said camera body, a viewing optical system located in said case, a taking lens mounted in and having its optical axis extending through said camera body, means within said camera body for locating a photosensitive surface on and extending transversely of the optical axis of said taking lens, a movable mirror positioned within said camera body at an inclined position to the optical axis of said taking lens and interposed between said taking lens and the location of the photosensitive surface, a focusing screen positioned between said mirror and said viewing optical system and said focusing screen being in the same angular position relative to and on the opposite side of said mirror from the location of the photosensitive surface, said movable mirror arranged to introduce light passing through said taking lens onto said focusing screen, a shutter associated with said taking lens, and shutter actuating means for said shutter, wherein the improvement comprises means in operative engagement with said shutter actuating means for moving said mirror along a rectilinear path located transversely of the optical axis of said taking lens into a standby position laterally displaced from its position interposed between said taking lens and the photosensitive surface, wall means associated with said camera body for forming a housing arranged to receive at least a portion of said mirror when it is displaced into its standby position, said means for moving said mirror comprises a slide plate having a window-like opening therein, said mirror being supported on said slide plate in said window-like opening, a guide member mounted at an inclined position to the optical axis of said taking leans, and said slide plate slidably mounted in said guide member for moving said mirror into the standby position with said slide member being guided in a rectilinear path disposed at right angles to the optical axis of said taking lens.

2. A single-lens reflex camera including walls forming a camera body, a case mounted on said camera body, a viewing optical system located in said case, a taking lens mounted in and having its optical axis extending through said camera body, means within said camera body for locating a photosensitive surface on and extending transversely of the optical axis of said taking lens, a movable mirror positioned within said camera body at an inclined position to the optical axis of said taking lens and interposed between said taking lens and the location of the photosensitive surface, a focusing screen positioned between said mirror and said viewing optical system and said focusing screen being in the same angular position relative to and on the opposite side of said mirror from the location of the photosensitive surface, said movable mirror arranged to introduce light passing through said taking lens onto said focusing screen, a shutter associated with said taking lens, and shutter actuating means for said shutter, wherein the improvement comprises means in operative engagement with said shutter actuating means for moving said mirror along a rectilinear path located transversely of the optical axis of said taking lens into a standby position laterally displaced from its position interposed between said taking lens and the photosensitive surface, wall means associated with said camera body for forming a housing arranged to receive at least a portion of said mirror when it is displaced into its standby position, said means for moving said mirror out of the optical axis of said taking leans into the standby position comprises a disk positioned within said camera body and arranged to rotate through a predetermined angle as said shutter actuating means is actuated, a first bell-crank arranged in cooperating relationship with said disk and arranged to pivot as said disk rotates, a second bell-crank disposed in cooperating relationship with said first bell-crank and arranged to pivot in conjunction with the pivotal movement of the arms of said first bellcrank, and a connector for connecting said second bellcrank to said slide plate.

3. A single-lens reflex camera, as set forth in claim 1, wherein said guide member comprises a rectangularly shaped guide plate, mounting members positioned within said camera body and said guide plate mounted on said mounting members for supporting said guide plate inclined 45° with respect to the optical axis of said taking lens, said guide plate extending through one wall of said camera body outwardly thereof, said guide plate being bent at its upper and lower marginal edges for forming channels for said guide plate, and said guide plate having a window-like opening therein positioned on the optical axis of said taking lens and being of the same size and shape as the window-like opening formed in said slide plate, the window-like opening in said guide plate arranged to permit picture-taking light to pass therethrough to the location of the photosensitive surface.

4. A single-lens reflex camera, as set forth in claim 3, wherein the channels in said guide plate extend laterally from within said camera body into said housing extending outwardly from said camera body and the outer ends of said channels in said guide plate within said housing are open.

5. A single-lens reflex camera, as set forth in claim 4, wherein said wall means include a cover member secured integrally to and extending outwardly from the wall of said camera body through which said guide plate extends, the outer end of said cover member being open, a flattened cylindrical member having an inner end corresponding to the open outer end of said cover member and being fitted telescopically lighttight in the interior of said cover member so that said cylindrical member can be displaced toward and away from said camera body.

6. A single-lens reflex camera, as set forth in claim 5, wherein a guide is attached to a central portion of the outer surface of said cylindrical member for guidng said cylindrical member in its movement relative to said camera with substantially one half of the lengthwise dimension of said guide projecting from said cylindrical member toward said camera body.

7. A single-lens reflex camera, as set forth in claim 5, wherein said wall means includes a grip fitted over and secured to said cylindrical member, and said grip being used for holding the camera.

8. A single-lens reflex camera, as set forth in claim 7, wherein the exterior surface of said grip for holding the camera has a wave-shaped configuration.

9. A single-lens reflex camera, as set forth in claim 6, wherein a holder is secured to the interior of said cover member and said walls of said camera body to which said guide plate extends, and said guide for said cylindrical member is slidably supported by said holder.

10. A single-lens reflex camera, as set forth in claim 9, wherein a threaded member extends into and in threaded engagement with said holder and said cover member, said threaded member having a portion located exteriorly of said housing for tightening and loosening said threaded member so that said guide can be moved outwardly from said camera body so that the camera is in operating condition and moved inwardly into said camera body so that said camera is in inoperative condition.

11. A single-lens reflex camera, as set forth in claim 5, wherein a stopper is located on the inner end of said guide for said cylindrical member and is arranged to abut against the interior surface of said wall through which said guide plate extends for limiting the outward movement of said cylindrical member.

12. A single-lens reflex camera, as set forth in claim 5, wherein locking means extend between said cylindrical member and said shutter actuating means so that actuating of said shutter actuating means is automatically precluded when said cylindrical member is moved inwardly into said camera body thereby rendering the camera in the inoperative condition.

13. A single-lens reflex camera, as set forth in claim 12, wherein said locking means comprises a locking rod arranged to be moved transversely of the optical axis of said taking lens in said camera body and said locking rod arranged in the path of said cylindrical member so that said locking rod is displaced into locking engagement with said shutter actuating means when said cylindrical member is moved inwardly into said camera body.

14. A single-lens reflex camera, as set forth in claim 13, wherein a flange is mounted on said locking rod adjacent said wall of said camera body through which said guide plate extends, a coil spring mounted between said flange and an immovable part of said camera body for normally biasing the said locking rod in the direction in which said grip is moved away from said camera body.

15. A single-lens reflex camera, as set forth in claim 2, wherein a film advance lever is mounted on the exterior of said camera and is arranged to restore said disk to its original position when said lever is operated, a lever connected to said disk, and a drive spring arranged to pivot said lever and rotate said disk, and a shutter for said viewing optical system arranged to close when said disk rotates.

16. A single-lens reflex camera, as set forth in claim 15, wherein a segmental gear is formed on said lever, a shutter actuating ring, means disposed between said segmental gear and said shutter actuating ring for rotating said shutter actuating ring when said segmental gear rotates.

17. A single-lens reflex camera, as set forth in claim 16, characterized therein by a shutter, a charge pin and a shutter release pin associated with said shutter, said shutter actuating ring maintained in engagement with said charge pin and shutter release pin for charging the shutter in the initial stages of its rotation and releasing the charged shutter when said movable mirror is completely displaced from the path of the optical axis of the taking lens into the standby position.

18. A single-lens reflex camera, as set forth in claim 15, wherein said actuating means for said shutter for said viewing optical system is arranged to open and close the path of light therethrough and comprises an arm arranged to pivot when said disk rotates, a slide bar in engagement with and arranged to follow the movement of said arm, a bellcrank arranged to pivot when said slide bar moves, and a pusher mounted on said bellcrank.

19. A single-lens reflex camera, as set forth in claim 18, wherein said shutter for said viewing optical system is arranged in operative engagement with said shutter actuating means through said means for moving said mirror for commencing to close simultaneously as said shutter closes when said shutter actuating means is actuated and closes completely after said shutter is closed, said movable mirror begins to move out of the path of the optical axis of said taking lens when said viewing optical system completely closes, and said shutter opens and closes in accordance with a preset shutter time after said movable mirror has moved out of the optical axis of said taking lens into the standby position.

* * * * *